(12) United States Patent
Fujieda et al.

(10) Patent No.: US 8,033,520 B2
(45) Date of Patent: Oct. 11, 2011

(54) VEHICLE SEAT SLIDE MECHANISM

(75) Inventors: Masahiro Fujieda, Toyota (JP);
Yasuhiro Kojima, Kariya (JP)

(73) Assignees: Toyota Boshoku Kabushiki Kaisha,
Aichi-ken (JP); Aisin Seiki Kabushiki Kaisha, Aichi-Ken (JP)

( * ) Notice: Subject to any disclaimer, the term of this patent is extended or adjusted under 35 U.S.C. 154(b) by 72 days.

(21) Appl. No.: 12/594,357

(22) PCT Filed: Mar. 13, 2008

(86) PCT No.: PCT/JP2008/054593
§ 371 (c)(1),
(2), (4) Date: Nov. 25, 2009

(87) PCT Pub. No.: WO2008/126615
PCT Pub. Date: Oct. 23, 2008

(65) Prior Publication Data
US 2010/0133407 A1    Jun. 3, 2010

(30) Foreign Application Priority Data

Apr. 5, 2007 (JP) .................................. 2007-099373

(51) Int. Cl.
*F16M 13/00* (2006.01)
(52) U.S. Cl. .................... 248/430; 296/65.14; 297/311; 297/344.1
(58) Field of Classification Search .................. 248/430, 248/429, 424; 296/65.13, 65.14; 297/344.11, 297/311
See application file for complete search history.

(56) References Cited

U.S. PATENT DOCUMENTS

| 7,204,467 | B2  |    | 4/2007  | Strubel et al. |
|-----------|-----|----|---------|----------------|
| 7,506,856 | B2  | *  | 3/2009  | Ikegaya et al. ................ 248/430 |
| 7,588,293 | B2  | *  | 9/2009  | Kojima ........................ 297/344.1 |
| 7,735,798 | B2  | *  | 6/2010  | Kojima .......................... 248/429 |
| 7,770,863 | B2  | *  | 8/2010  | Yamada et al. ................ 248/429 |
| 2004/0131291 | A1 | * | 7/2004 | Niimi et al. ...................... 384/47 |
| 2007/0090263 | A1 | * | 4/2007 | Yamada et al. ................ 248/429 |
| 2008/0048087 | A1 | * | 2/2008 | Kojima et al. ................. 248/430 |
| 2009/0080814 | A1 |   | 3/2009 | Kojima et al. |
| 2009/0114793 | A1 | * | 5/2009 | Brewer et al. ................. 248/429 |
| 2009/0167073 | A1 |   | 7/2009 | Fujieda |
| 2010/0133407 | A1 | * | 6/2010 | Fujieda et al. ................ 248/429 |
| 2010/0320353 | A1 | * | 12/2010 | Kojima et al. ................ 248/430 |
| 2011/0042540 | A1 | * | 2/2011 | Becker et al. ................. 248/429 |

FOREIGN PATENT DOCUMENTS

FR    2746721    10/1997
(Continued)

OTHER PUBLICATIONS

English language Abstract of JP 2006-298104, Nov. 2, 2006.
(Continued)

*Primary Examiner* — Ramon Ramirez
(74) *Attorney, Agent, or Firm* — Greenblum & Bernstein, P.L.C.

(57) ABSTRACT

An upper rail constituting a slide mechanism has engagement surface portions and engagement surface portions each having a projected surface portion. The engagement surface portions are positioned at front and rear two portions of the upper rail. A lower rail has detent surface portions formed between the engagement surface portions and the engagement surface portions. The detent surface portions are covered with the upper rail. When the engagement surface portions or the engagement surface portions contact the detent surface portions due to sliding of the upper rail, a vehicle seat can be prevented from sliding.

4 Claims, 5 Drawing Sheets

FOREIGN PATENT DOCUMENTS

| | | |
|---|---|---|
| FR | 2847530 | 5/2004 |
| FR | 2888539 | 1/2007 |
| JP | 8-156659 | 6/1996 |
| JP | 2005-67218 | 3/2005 |
| JP | 2006-298104 | 11/2006 |

OTHER PUBLICATIONS

English language Abstract of JP 2005-67218, Mar. 17, 2005.
English language Abstract of JP 8-156659, Jun. 18, 1996.

* cited by examiner

VEHICLE SEAT SLIDE MECHANISM

TECHNICAL FIELD

The present invention relates to a vehicle seat slide mechanism. More particularly, the present invention relates to a vehicle seat slide mechanism that is capable of sliding a vehicle seat with respect to a floor.

BACKGROUND ART

Conventionally, a vehicle seat having a longitudinal slide mechanism is provided with a stopper structure for restricting a sliding amount thereof. Japanese Laid-Open Patent Publication Number 2005-67218 teaches art in which a stopper structure is disposed between upper rails and lower rails that constitute a slide mechanism. In the teachings, each of the lower rails has projected restriction members that are disposed on longitudinally spaced two portions thereof. Conversely, each of the upper rails has a projected engagement member that is capable of contacting the restriction members described above, thereby preventing each of the upper rails from sliding.

Thus, there is a need in the art to prevent any foreign matter from entering into a stopper structure that is provided to a vehicle seat slide mechanism.

SUMMARY OF THE INVENTION

A vehicle seat slide mechanism of the present invention is capable of sliding the vehicle seat with respect to a floor. The slide mechanism includes an upper rail and a lower rail. The upper rail is attached to the vehicle seat and extends in a sliding direction of the vehicle seat. The lower rail is attached to a floor as a guide member slidably guiding the upper rail and extends in a sliding direction of the upper rail. The upper rail has engagement surface portions each having a projected surface portion that is projected downwardly with respect to the sliding direction thereof. The engagement surface portions are positioned at two portions that are spaced from each other in the sliding direction of the upper rail. The lower rail has a detent surface portion having a projected surface portion that is projected upwardly with respect to the sliding direction of the upper rail. The detent surface portion is formed between the engagement surface portions formed in the upper rail. The detent surface portion is arranged and constructed to be covered with the upper rail. When one of the engagement surface portions contacts the detent surface portion due to sliding of the upper rail, the vehicle seat can be prevented from sliding.

According to the construction of this invention, the detent surface portion projected from the lower rail cannot be exposed regardless of sliding positions of the upper rail. That is, the detent surface portion is formed between the engagement surface portions that are formed in the two portions in the sliding direction of the upper rail. Therefore, a projection profile of the detent surface portion cannot be exposed. Thus, because the detent surface portion projected from the lower rail cannot be exposed regardless of sliding positions of the upper rail, if a stopper structure is provided to the vehicle seat slide mechanism, any projections cannot be formed in a lower surfaces thereof. Therefore, it is possible to construct the slide mechanism so as to prevent any foreign matter from entering into the stopper structure.

The construction of this invention can be modified as follows. That is, the engagement surface portions formed in the upper rail and the detent surface portion formed in the lower rail can respectively be formed by stamping out and bending a portion of the upper rail or the lower rail.

According to the construction of the present invention, the engagement surface portions and the detent surface portion are integrally formed with the upper rail or the lower rail by stamping out and bending a portion of the upper rail or the lower rail. As a result, it is possible to construct the stopper structures without increasing the number of construction elements.

Further, the construction of this invention can be modified as follows. That is, the engagement surface portions formed in the upper rail can be formed by stamping out a lower surface portion of the upper rail and bending the same downwardly therefrom. Conversely, the detent surface portion formed in the lower rail can be formed by stamping out a lower surface portion of the lower rail and bending the same upwardly therefrom.

According to the construction of the present invention, the engagement surface portions and the detent surface portion are respectively formed by stamping out and bending at portions that are positioned vertically closer to each other. Therefore, it is possible to minimize projection amounts of the engagement surface portions and detent surface portion and to increase engagement strength thereof.

Further, the construction of this invention can be modified as follows. That is, the upper rail and the lower rail can respectively be disposed in pairs. Further, the respective pairs of upper and lower rails can be disposed between the vehicle seat and the floor.

According to the construction of the present invention, the vehicle seat can be restricted from sliding via the upper rail and the lower rail that are respectively disposed in pairs between the vehicle seat and the floor. As a result, a slide restriction force applied between the vehicle seat and the floor can be uniformly dispersed without concentrating in one direction.

BEST MODE FOR CARRYING OUT THE INVENTION

In the following, the best mode for carrying out the present invention will be described with reference to the drawings.

Embodiment 1

Figure 1:
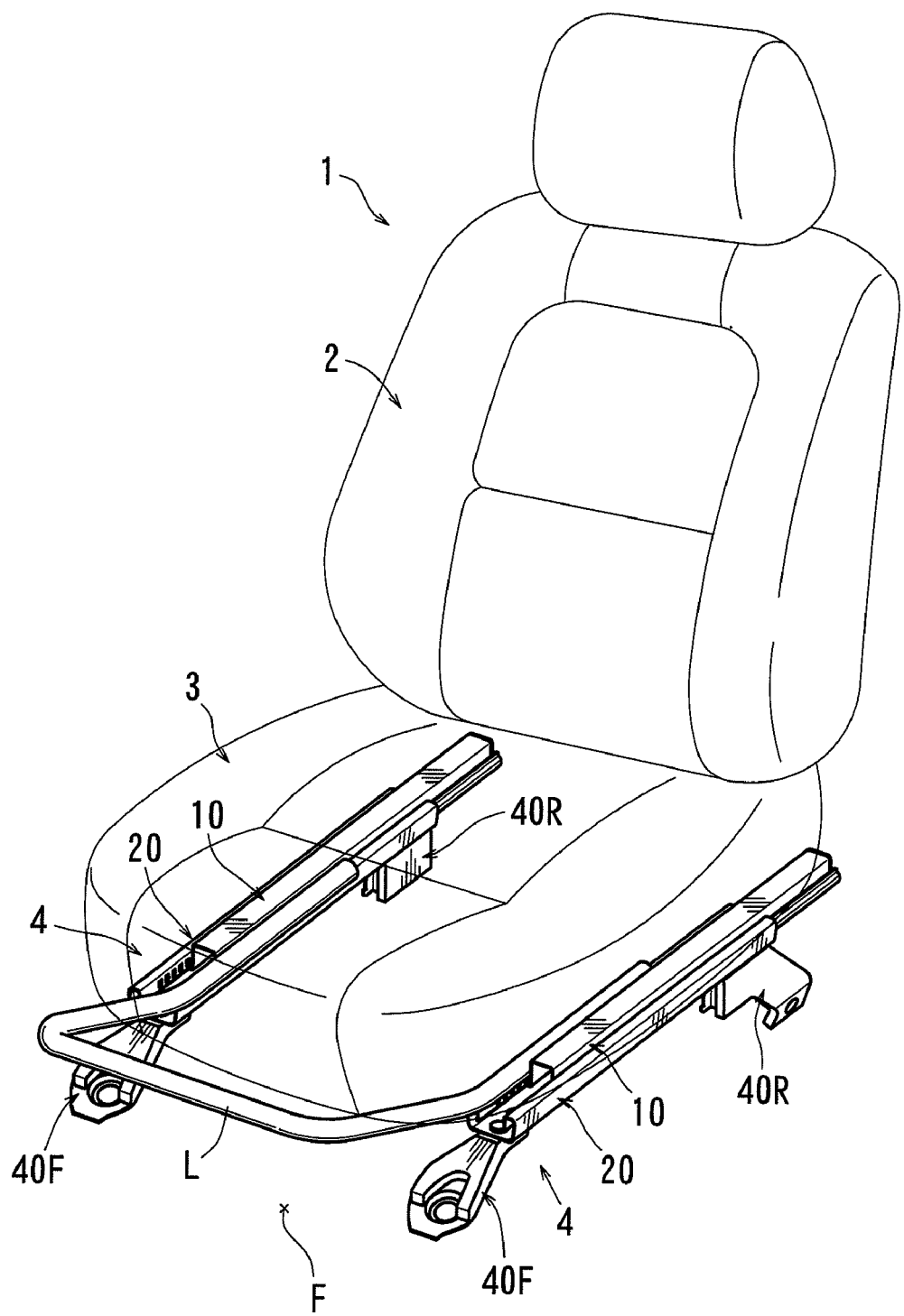
FIG. 1 is a schematic perspective view of a structure of a vehicle seat slide mechanism according to Embodiment 1.

First, a structure of slide mechanisms of a vehicle seat according to Embodiment 1 will be described with reference to FIGS. 1 to 6. In FIG. 1, a general structure of a whole vehicle seat 1 is shown as a perspective view. The vehicle seat 1 has a seat back 2 constituting a back supporting portion and a seat cushion 3 constituting a seating portion. The vehicle seat 1 is constructed such that a longitudinal sliding position thereof with respect to a floor F can be adjusted via a pair of right and left slide mechanisms 4 and 4 that are disposed between the seat cushion 3 and the floor F.

The slide mechanisms 4 and 4 are normally maintained in locked conditions in which longitudinal sliding movement of the vehicle seat 1 is restricted. Further, the slide mechanisms 4 and 4 are constructed such that the locked conditions thereof can be simultaneously released by lifting up an operation lever L that is disposed under a front side portion of the seat cushion 3. Further, when the locked conditions of the slide mechanisms 4 and 4 are released, the vehicle seat 1 is permitted to slide longitudinally. Conversely, when a lifting up operation of the operation lever L is stopped, the slide mechanisms 4 and 4 can be returned to the locked conditions in which the vehicle seat 1 is restricted from sliding.

Further, each of the slide mechanisms 4 and 4 described above is provided with a stopper structure for restricting a longitudinal sliding amount thereof. Therefore, even when the vehicle seat 1 is slid forwardly or rearwardly by performing the lifting up operation of the operation lever L, each of the slide mechanisms 4 and 4 can be controlled such that the sliding amount thereof can fall within a predetermined range by means of the stopper structure described above.

In the following, construction of the slide mechanisms 4 and 4 will be described in detail. Although the right and left slide mechanisms 4 and 4 are respectively symmetrically shaped, they have the substantially same construction as each other. Therefore, in the following, only the construction of the slide mechanism 4 that is positioned on the right side in FIG. 1 will be described as a representative thereof.

Figure 2:
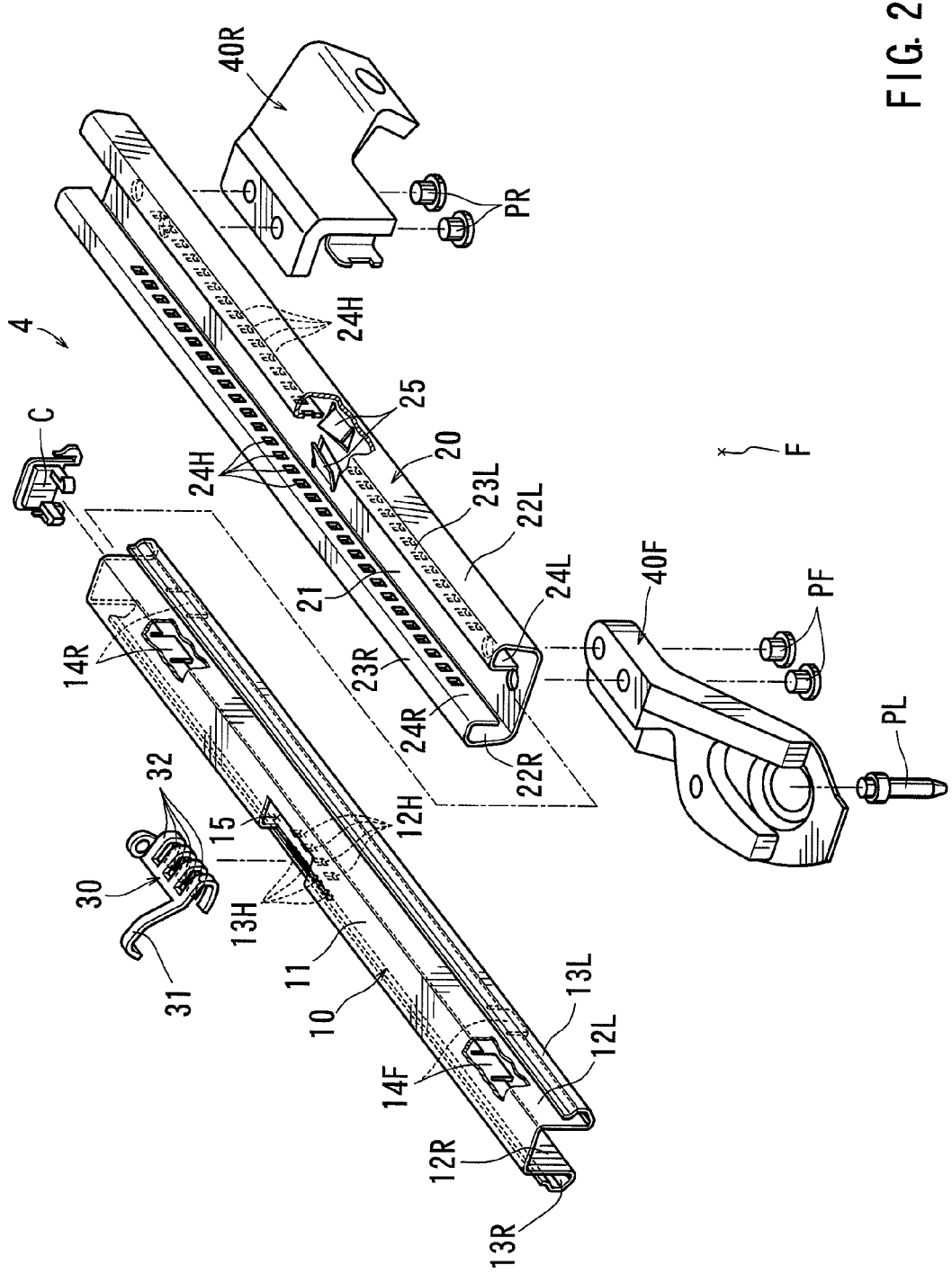
FIG. 2 is an exploded perspective view of the slide mechanism.

In FIG. 2, construction elements of the slide mechanism 4 is shown as an exploded perspective view thereof. The slide mechanism 4 has longitudinally elongated upper and lower rails 10 and 20 that function as slide components, and a lock member 30 that is capable of precluding sliding thereof. In particular, the upper rail 10 is integrally attached to the seat cushion 3. Conversely, the lower rail 20 is integrally attached to the floor F via front and rear support members 40F and 40R that are positioned on a lower side thereof in the drawing.

Figure 3:
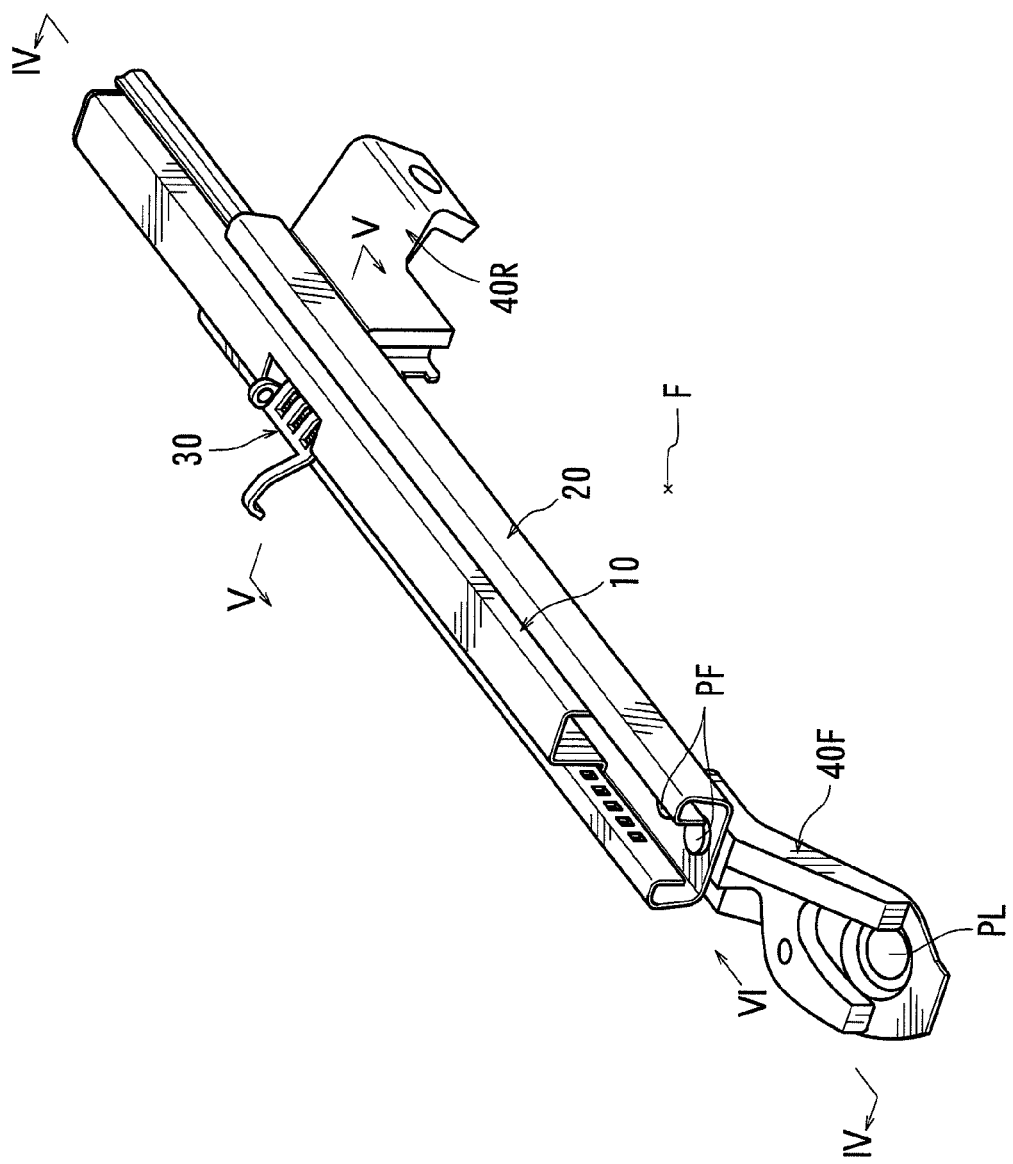
FIG. 3 is a view of the slide mechanism showing a condition in which the slide mechanism is assembled.

The lower rail 20 is shaped in a U-shape in cross section so as to have side walls at both sides. Further, the upper rail 10 is longitudinally inserted into a U-shaped interior of the lower rail 20 from a longitudinal front or rear open end thereof. Thus, the upper rail 10 can be slidably guided so as to longitudinally slide along a U-shaped space of the lower rail 20. FIG. 3 shows a condition in which the upper rail 10 is coupled to the lower rail 20.

Next, with reference to FIG. 2 again, the lock member 30 is attached to the upper rail 10. The lock member 30 has four engagement claws 32 . . . . The engagement claws 32 . . . are capable of being inserted into four through-holes 12H . . . and four through-holes 13H . . . that are respectively formed in a right side surface portion 12R and a right fin surface portion 13R of the upper rail 10, which will be described hereinafter. Further, the lock member 30 has an operation arm 31 extending in an arm-like fashion. The operation lever L as previously described with reference to FIG. 1 is connected to the operation arm 31. Thus, when the operation lever L is operated at the other end thereof, the lock member 30 can be operated such that the engagement claws 32 thereof can be inserted into or removed from the through-holes 12H . . . and the through-holes 13H . . . .

Figure 5:
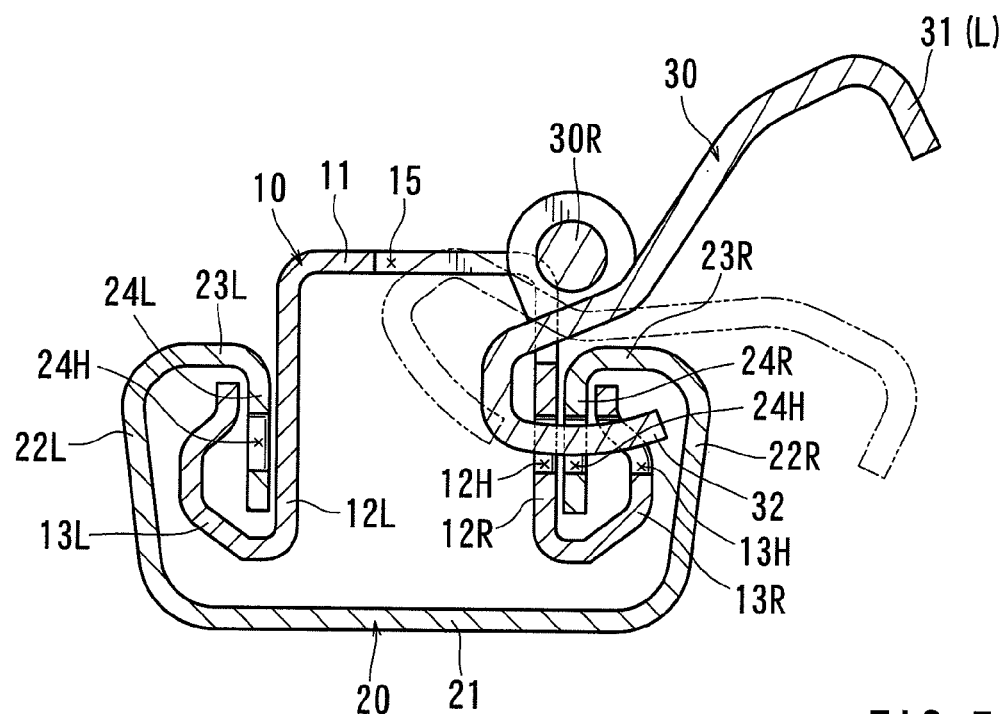
FIG. 5 is a sectional view taken along line V-V of FIG. 3.

In particular, as shown in FIG. 5, the lock member 30 is rotatably connected to the upper rail 10 via a connection shaft 30R. Further, the lock member 30 is always biased counterclockwise in the drawing via a biasing force of a spring member (not shown) that is disposed between the same and the upper rail 10. As a result, the lock member 30 is always biased in such a direction in which the engagement claws 32 . . . are inserted into the through-holes 12H . . . and the through-holes 13H . . . .

With reference to FIG. 2 again, the four through-holes 12H . . . and the four through-holes 13H . . . formed in the upper rail 10 described above are longitudinally arranged and formed at equal intervals therealong while facing each other. Further, the lower rail 20 also has a plurality of through-holes 24H . . . that are formed in a right fold-back surface portion 24R which will be described hereinafter. The through-holes 24H . . . are shaped so as to face the four through-holes 12H . . . and the four through-holes 13H . . . described above.

The through-holes 24H . . . are longitudinally arranged and formed at equal intervals along the right fold-back surface portion 24R of the lower rail 20. Further, the through-holes 24H . . . are formed to have the same intervals as the four through-holes 12H . . . and the four through-holes 13H . . . . Therefore, when the upper rail 10 is slid in a longitudinal direction, the four through-holes 12H . . . and the four through-holes 13H . . . formed in the upper rail 10 can be aligned with any consecutive four of the through-holes 24H . . . formed in the lower rail 20 at predetermined intervals.

Therefore, as shown in FIG. 5, when the respective holes formed in the upper rail 10 and the lower rail 20 are mutually longitudinally aligned with each other by sliding the upper rail 10, the engagement claws 32 . . . are respectively inserted into the through-holes corresponding thereto due to the biasing force applied to the lock member 30. Thus, due to engagement of the engagement claws 32 . . . described above, the upper rail 10 can be changed to a condition in which the upper rail 10 is prevented from longitudinally sliding with respect to the lower rail 20.

In a normal condition in which the operation lever L is not lifted up, due to the engagement of the engagement claws 32 . . . of the lock member 30 described above, the upper rail 10 is maintained in the condition in which the upper rail 10 is prevented from sliding. A locked condition of the upper rail 10 described above can be released by lifting up an operation lever L, so that the upper rail 10 can be switched to a condition in which the upper rail 10 is capable of longitudinally sliding with respect to the lower rail 20.

Figure 6:
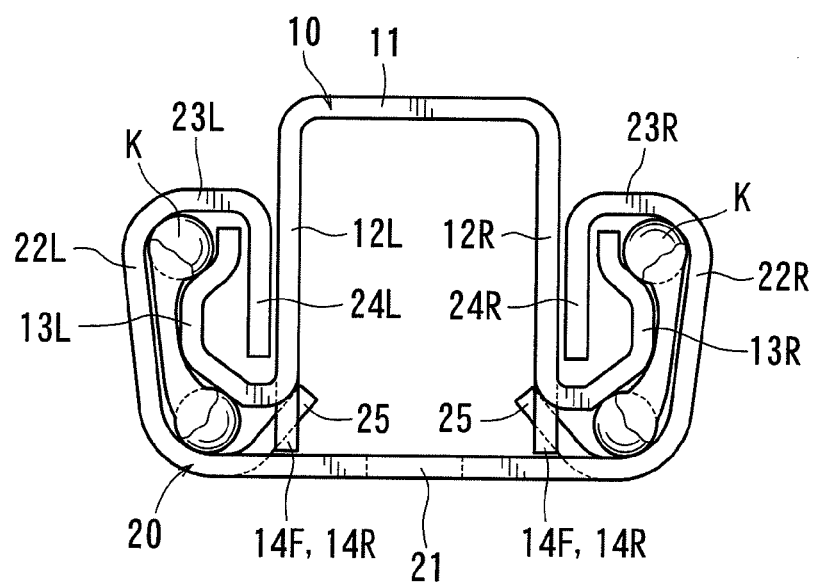
FIG. 6 is a structural view of the slide mechanism viewed from line VI of FIG. 3.

Further, as shown in FIG. 6, bearings K and K (ball bearings) are disposed on outer sides of the right fin surface portion 13R and a left fin surface portion 13L of the upper rail 10. As a result, the upper rail 10 can slide smoothly with respect to the lower rail 20.

Thus, with reference to FIG. 1, when the operation lever L is lifted up to longitudinally slide the upper rails 10, the longitudinal sliding position of the vehicle seat 1 with respect to the floor F can be changed. Thereafter, when the lifting up operation of the operation lever L is stopped after the sliding position of the vehicle seat 1 is adjusted, the slide mechanisms 4 and 4 can be returned to the locked conditions again. Thus, the vehicle seat 1 can be maintained in an adjusted sliding position.

Figure 4:
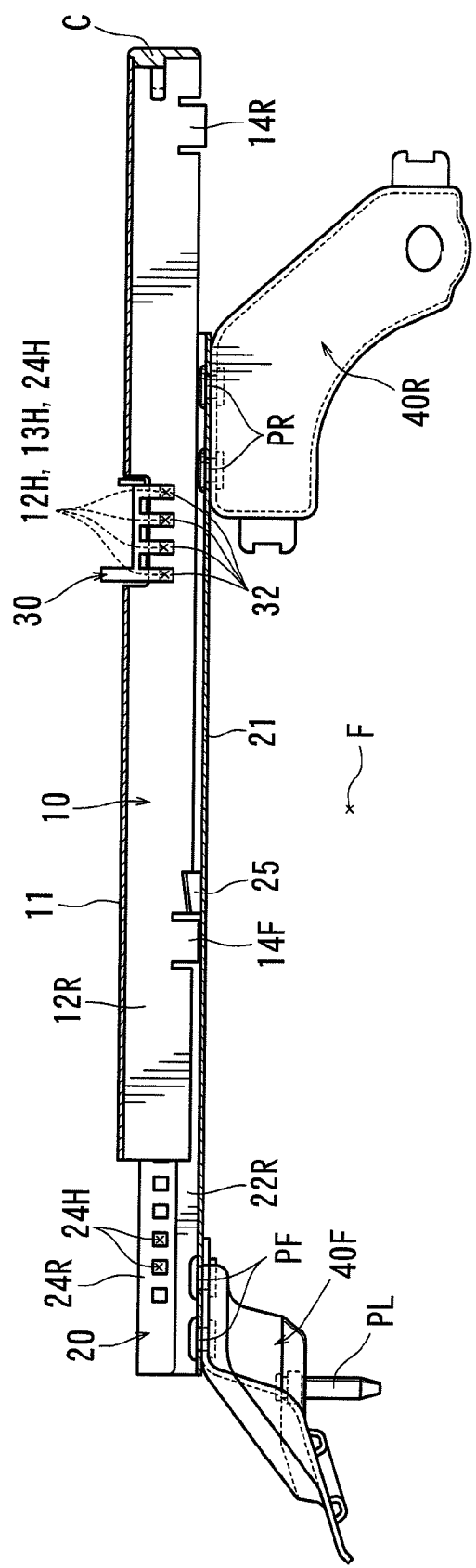
FIG. 4 is a sectional view taken along line IV-IV of FIG. 3.

A longitudinal sliding range of the vehicle seat 1 is limited to the predetermined range by means of the stopper structures that are provided to the slide mechanisms 4 and 4. In particular, as shown in FIG. 4, forward sliding of the upper rail 10 can be stopped when engagement surface portions 14R and 14R formed in the upper rail 10 contact rear surface portions of detent surface portions 25 and 25 formed in the lower rail 20. The engagement surface portions 14R and 14R are respectively formed in rear side surface portions of the upper rail 10 by stamping out and bending. Conversely, the detent surface portions 25 and 25 are formed in a substantially central surface portion of the lower rail 20 by stamping out and bending.

Further, rearward sliding of the upper rail 10 can be stopped when engagement surface portions 14F and 14F formed in the upper rail 10 contact front surface portions of the detent surface portions 25 and 25 that are formed in the lower rail 20. The engagement surface portions 14F and 14F are respectively formed in front side surface portions of the upper rail 10 by stamping out and bending. Conversely, as previously described, the detent surface portions 25 and 25 are formed in the substantially central surface portion of the lower rail 20 by stamping out and bending. Next, arrangement and shape of the stopper structure described above will be described in detail along with specific shapes of the upper rail 10 and the lower rail 20.

First, the shape of the upper rail 10 will be described. As shown in FIG. 2, the upper rail 10 is formed in a cross-sectional shape that is capable of slidably fitting into the lower rail 20 having the U-shaped space in cross section. The upper rail 10 is formed into the predetermined cross-sectional shape shown in the drawing by partially bending a single flat plate member formed of steel material.

In particular, the cross-sectional shape of the upper rail 10 is well shown in FIG. 5. As shown in the drawing, the upper rail 10 is constructed of a flat plate-shaped upper surface portion 11, flat plate-shaped right and left side surface portions 12R and 12L that respectively extending vertically downwardly from both sides thereof, and right and left fin surface portions 13R and 13L that are bent up outwardly from their lower ends.

With reference to FIG. 2 again, the four through-holes 12H . . . and the four through-holes 13H . . . are respectively formed in substantially longitudinal central portions of the right side surface portion 12R and the right fin surface portion 13R while penetrating the same in a thickness direction. Further, these through-holes are respectively longitudinally arranged at equal intervals while facing each other in a width direction. Further, the engagement surface portions 14F and 14F and the engagement surface portions 14R and 14R are respectively formed in front side surface portions and rear side surface portions of the right side surface portion 12R and the left side surface portion 12L. These engagement surface portions are respectively formed in lower surface portions of the right and left side surface portions 12R and 12L by stamping out and bending, so as to be projected directly downwardly therefrom.

In order to form the engagement surface portions 14F and 14F and the engagement surface portions 14R and 14R, slots are previously formed in the flat plate member so as to respectively straddle the right side surface portion 12R and the right fin surface portion 13R or the left side surface portion 12L and the left fin surface portion 13L. Thus, when the flat plate member is bent into the upper rail 10, the engagement surface portions 14F and 14F and the engagement surface portions 14R and 14R can be formed along the slots, so as to project downwardly from the lower surface portions of the right side surface portion 12R and the left side surface portion 12L.

A reception opening 15 for attaching the lock member 30 described above is formed in a substantially longitudinal central surface portion of the upper rail 10. The reception portion 15 is formed so as to open in the upper surface portion 11 and the right side surface portion 12R. Further, a cap C is attached to a longitudinal rear open end of the upper rail 10 in order to close the rear open end.

Next, the shape of the lower rail 20 will be described. As shown in FIG. 2, the lower rail 20 is formed to have the U-shape space in cross section that is capable of longitudinally slidably guiding the upper rail 10 described above. The lower rail 20 is formed into the predetermined cross-sectional shape shown in the drawing by partially bending a single flat plate member formed of steel material.

In particular, the cross-sectional shape of the lower rail 20 is well shown in FIG. 5. As shown in the drawing, the lower rail 20 is constructed of a flat plate-shaped lower surface portion 21, flat plate-shaped right and left side surface portions 22R and 22L that respectively extend upwardly from both sides thereof, flat plate-shaped upper surface portions 23R and 23L that are bent horizontally inwardly from their upper ends, and flat plate-shaped right and left fold-back surface portions 24R and 24L that respectively extend vertically downwardly from inner ends of the upper surface portions 23R and 23L.

With reference to FIG. 2 again, the right fold-back surface portion 24R and the left fold-back surface portion 24L respectively have a plurality of through-holes 24H . . . and through-holes 24H . . . that are respectively longitudinally arranged and formed at equal intervals therealong while penetrating the same in a thickness direction. Further, the reason that the through-holes 24H . . . are also formed in the left fold-back surface portion 24L is to make it possible for the lower rail 20 to be used as both of a right side rail component and a left side rail component.

Further, the detent surface portions 25 and 25 are formed in a portion forwardly displaced from a central surface portion of the lower surface portion 21. The detent surface portions 25 and 25 are formed by stamping out and bending so as to project upwardly. In addition, the detent surface portions 25 and 25 are formed by stamping out and bending so as to be separated into right and left. Thus, upon sliding of the upper rail 10, the detent surface portions 25 and 25 can respectively interfere with the front and rear engagement surface portions 14F and 14R formed in the right side surface portion 12R of the upper rail 10 and the front and rear engagement surface portions 14F and 14R formed in the left side surface portion 12L of the upper rail 10.

As shown in FIG. 4, the detent surface portions 25 and 25 are arranged and formed so as to be positioned between the front engagement surface portions 14F and 14F and the rear engagement surface portions 14R and 14R that are respectively formed in the upper rail 10. Therefore, when the upper rail 10 is slid rearwardly, the detent surface portions 25 and 25 that are formed by stamping out and bending can receive the front engagement surface portions 14F and 14F formed in the upper rail 10 at the front surface portions thereof. As a result, the upper rail 10 can be positioned in the condition in which the upper rail 10 is prevented from sliding rearwardly.

Conversely, when the upper rail 10 is slid forwardly, the detent surface portions 25 and 25 that are formed by stamping out and bending can receive the rear engagement surface portions 14R and 14R formed in the upper rail 10 at the rear surface portions thereof. As a result, the upper rail 10 can be positioned in the condition in which the upper rail 10 is prevented from sliding forwardly. That is, the detent surface portions 25 and 25 are positioned between the front engagement surface portions 14F and 14F and the rear engagement surface portions 14R and 14R that are respectively formed in the upper rail 10, so that projection profiles of the detent surface portions 25 and 25 cannot be exposed regardless of sliding positions of the upper rail 10.

FIG. 6 clearly shows a condition in which the detent surface portions 25 and 25 interfere with the engagement surface portions 14F and 14F and the engagement surface portions 14R and 14R that are formed in the upper rail 10. Construction of the front and rear support members 40F and 40R attached to the lower surface portion 21 of the lower rail 20 will be briefly described. The support members 40F and 40R are integrally connected to the lower surface portion 21 of the lower rail 20 via pins PF . . . and pins PR . . . . Further, the front support member 40F is integrally connected to the floor F via a pin PL. Conversely, the rear support member 40R is integrally secured to the floor F via a protruding pin (not shown) that is integrally connected to the floor F.

Next, a method of use of this embodiment will be described. As shown in FIG. 1, in the condition in which the operation lever L is not lifted up, the vehicle seat 1 is maintained in a condition in which the vehicle seat 1 is prevented from sliding. When the lifting up operation of the operation lever L is performed in order to adjust the longitudinal sliding position of the vehicle seat 1, the slide locked conditions of the slide mechanisms 4 and 4 can be released. Therefore, the vehicle seat 1 can be slid longitudinally while the operation lever L is operated, so that the longitudinal sliding position thereof can be adjusted.

Thereafter, when the operation of the operation lever L is stopped, the slide mechanisms 4 and 4 can be returned to the locked conditions again. Thus, the vehicle seat 1 can be maintained in the adjusted sliding position. Further, the longitudinal sliding range of the vehicle seat 1 is limited to the predetermined range by means of the stopper structures described above. Therefore, even when the lifting up operation of the operation lever L is maintained, the vehicle seat 1 cannot slide beyond this range.

Thus, according to the slide mechanisms of a vehicle seat of the embodiment, the detent surface portions 25 and 25 projected from the lower rail 20 cannot be exposed regardless of the sliding positions of the upper rail 10. As a result, when the stopper structures are provided to the slide mechanisms 4 and 4 in order to restrict the longitudinal sliding amounts thereof, projections cannot be present in lower surfaces thereof. Therefore, it is possible to construct the slide mechanisms 4 and 4 so as to prevent any foreign matter from entering into the stopper structures that are provided thereto.

Further, the engagement surface portions 14F and 14F, the engagement surface portions 14R and 14R and the detent surface portions 25 and 25 are respectively formed in the upper rail 10 and the lower rail 20 by stamping out and bending. Therefore, it is possible to construct the stopper structures without increasing the number of construction elements. Further, the engagement surface portions 14F and 14F, the engagement surface portions 14R and 14R and the detent surface portions 25 and 25 are respectively formed by stamping out and bending at portions that are positioned vertically closer to each other. Therefore, it is possible to minimize projection amounts of the engagement surface portions and the detent surface portions and to increase engagement strength thereof.

Further, the stopper structures are respectively provided to the right and left slide mechanisms 4 and 4 in order to restrict the longitudinal sliding amount thereof. Therefore, a slide restriction force applied between the vehicle seat 1 and the floor F can be uniformly dispersed right and left without concentrating in one direction.

One embodiment for carrying out the present invention has been described. However, the invention can be carried out in various modified forms. For example, the slide mechanisms can be disposed such that the vehicle seat can be slid in a lateral direction of the vehicle. Further, in the embodiment, the stopper structures are respectively provided to the slide mechanisms. However, only one stopper structure can be provided to one of the slide mechanisms. Naturally, in such a case, the slide restriction force applied between the vehicle seat and the floor can be concentrated to one of the right and left mechanisms. Therefore, it should be noted that a bending load or other such loads can be concentrated to construction elements of one of the right and left slide mechanisms.

Further, in the embodiment, the engagement surface portions and the detent surface portions as the stopper structures are respectively formed in the upper rail and the lower rail by stamping out and bending. However, such projection components can be separately formed and then be attached to the upper and lower rails. Further, in the embodiment, the engagement surface portions and the detent surface portions are respectively arranged and formed in lower surface portions of the upper and lower rails, so as to be positioned vertically closer to each other. However, the engagement surface portions and the detent surface portions can be arranged and formed in portions other than the lower surface portions of the upper and lower rails. Naturally, in such a case, it should be noted that if the engagement surface portions and the detent surface portions are positioned farther away from each other, it is necessary to increase the projection amounts of the engagement surface portions and detent surface portions and as a result, the engagement strength thereof can be reduced.

What is claimed is:

1. A vehicle seat slide mechanism that is capable of sliding a vehicle seat with respect to a floor, comprising:
    an upper rail attached to the vehicle seat and extending in a sliding direction of the vehicle seat; and
    a lower rail capable of being attached to the floor as a guide member slidably guiding the upper rail and extending in a sliding direction of the upper rail,
    wherein the upper rail has engagement surface portions each having a projected surface portion that is projected in a direction different from the sliding direction thereof, the engagement surface portions being positioned at two portions that are spaced from each other in the sliding direction of the upper rail,
    wherein the lower rail has a detent surface portion having a projected surface portion that is projected upwardly with respect to the sliding direction of the upper rail,
    wherein the detent surface portion is positioned between the engagement surface portions formed in the upper rail, so as to be covered with the upper rail,
    wherein when one of the engagement surface portions contacts the detent surface portion due to sliding of the upper rail, the vehicle seat can be prevented from sliding, and
    wherein the engagement surface portions provided to the upper rail are respectively formed so as to be projected from lower end portions of right and left side surface portions that continuously extend vertically downwardly from both sides of a flat plate-shaped upper surface portion of the upper rail.

2. The vehicle seat slide mechanism as defined in claim 1, wherein each of the engagement surface portions formed in the upper rail are respectively formed by stamping out and bending a portion of the upper rail.

3. A vehicle seat slide mechanism that is capable of sliding a vehicle seat with respect to a floor, comprising:
    an upper rail attached to the vehicle seat and extending in a sliding direction of the vehicle seat; and
    a lower rail capable of being attached to the floor as a guide member slidably guiding the upper rail and extending in a sliding direction of the upper rail, wherein the upper rail has engagement surface portions each having a projected surface portion that is projected in a direction different from the sliding direction thereof, the engagement surface portions being positioned at two portions that are spaced from each other in the sliding direction of the upper rail, wherein the lower rail has a detent surface portion having a projected surface portion that is projected upwardly with respect to the sliding direction of the upper rail, wherein the detent surface portion is positioned between the engagement surface portions formed in the upper rail, so as to be covered with the upper rail, wherein when one of the engagement surface portions contacts the detent surface portion due to sliding of the upper rail, the vehicle seat can be prevented from sliding, and wherein the detent surface portion provided to the lower rail is formed so as to be projected upwardly from a flat lower surface portion of the lower rail.

4. The vehicle seat slide mechanism as defined in claim 3, wherein the detent surface portion formed in the lower rail is formed by stamping out and bending a portion of the lower rail.

* * * * *